(12) United States Patent
Ise (10) Patent No.: US 6,368,747 B1
(45) Date of Patent: *Apr. 9, 2002

(54) METAL HYDRIDE STORAGE CELL HAVING EXCELLENT CHARGE AND DISCHARGE CYCLE CHARACTERISTIC

(75) Inventor: Tadashi Ise, Nibangoshi (JP)

(73) Assignee: Sanyo Electric Co., Ltd., Moriguchi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,026

(22) Filed: Mar. 4, 1997

(30) Foreign Application Priority Data

Mar. 5, 1996 (JP) ............................ 8-047610

(51) Int. Cl.[7] .............................. H01M 10/36
(52) U.S. Cl. ................. 429/218.2; 429/59; 420/900
(58) Field of Search ................. 429/218, 209, 429/59, 218.2; 420/900

(56) References Cited

U.S. PATENT DOCUMENTS

| | | | |
|---|---|---|---|
| 5,389,468 A | * | 2/1995 | Fujiwara et al. .............. 429/59 |
| 5,714,280 A | | 2/1998 | Nakano et al. ............. 429/197 |
| 5,886,499 A | | 3/1999 | Hall ........................... 320/101 |

FOREIGN PATENT DOCUMENTS

JP    0628 3171 A    10/1994

OTHER PUBLICATIONS

"Hydrogen and Metal Hydride Batteries", by Phillip D. Bennet and Tetsuo Sakai, The Electrochemical Society Proceedings vol. 94–27, 1994 (No month).

* cited by examiner

*Primary Examiner*—John S. Maples
(74) *Attorney, Agent, or Firm*—Armstrong, Westerman & Hattori, LLP (57) ABSTRACT

The present invention certainly provides a metal hydride storage cell having excellent cycle characteristic and a method of producing such a cell. In order to realize the objectives, the cell is produced under a condition which makes the particle size distribution y/x of the activated hydrogen absorbing alloy electrode below 0.90.

1 Claim, 5 Drawing Sheets

METAL HYDRIDE STORAGE CELL HAVING EXCELLENT CHARGE AND DISCHARGE CYCLE CHARACTERISTIC

BACKGROUND OF THE INVENTION (1) Field of the Invention

The present invention relates to a metal hydride storage cell having excellent charge and discharge cycle characteristic and a method of producing such a storage cell.

(2) Related Art

Along with the rapid development of the recent technologies, electronic devices are getting portable and cordless. As power for such devices, there is an increasing demand for compact secondary cells having high energy density and efficiency. Under such circumstances, metal hydride storage cells in which hydrogen absorbing alloy is used for the negative electrode are getting more and more attentions, as they are clean energy source having higher capacity and density compared to nickel-cadmium storage cells and lead storage cells.

The metal hydride storage cells require long charge and discharge cycle life as well as the high capacity. Japanese Laid-open Patent Application No. 6-283171 discloses determining the cumulative particle size distribution of the hydrogen absorbing alloy used in the negative electrode so as to obtain a metal hydride storage cell which has small increase of internal pressure during charging, long charge/discharge cycle life, and excellent rapid discharge characteristic. Specifically, it is to use alloy powder having the following cumulative particle size distribution for the negative electrode of the metal hydride storage cell: supposing that the diameter of the particle of the hydrogen absorbing alloy powder is expressed as R, which is the diameter of the two dimensions, the breakdown of the cumulation of the powder is as follows: 0% regarding R<10 $\mu$m; 5% regarding R<20 $\mu$m; 5–12% regarding R<30 $\mu$m; 20–30% regarding R<50 $\mu$m; 60–80% regarding R<100 $\mu$m; and 95–100% regarding R<300 $\mu$m.

As is disclosed in the above reference, the charging and discharging cycle life can be improved to some degree by making the particle size distribution of the hydrogen absorbing alloy rather sharp when used for the electrode which is to be used for a cell.

However, in reality, charge and discharge characteristic are affected by the charging and discharging conditions. The above mentioned technique does not necessarily guarantee the improvement of the cycle characteristic.

SUMMARY OF THE INVENTION

It is an object of the present invention to certainly provide a metal hydride storage cell which has excellent cycle characteristic and a method of producing such a metal hydride storage cell. The object can be achieved by the following features.

(1) A metal hydride storage cell using a hydrogen absorbing alloy for an electrode, the metal hydride storage call characterized by particle size distribution of the hydrogen absorbing alloy after charging and discharging under a given condition being y/x<0.90, with x being an average particle diameter and y being a standard deviation .

(2) A method of producing a metal hydride storage cell, comprising the steps of: assembling the cell by inserting an electrode group into a given casing into which electrolyte is poured, the electrode group comprising a positive electrode, a negative electrode which has the hydrogen absorbing alloy, and a separator sandwiched in-between; and giving at least one-cycle charging and discharging to the cell under a condition in which particle size distribution of the hydrogen absorbing alloy after charging and discharging becomes y/x<0.90, with x being an average particle diameter and y being a standard deviation.

The particle size distribution is measured by laser diffraction method.

There are some methods of adjusting the particle size distribution after the charging and discharging, such as adjusting particle size distribution of the hydride absorbing alloy used in the electrode, adjusting charging/discharging conditions, and heat treating the hydrogen absorbing alloy; a combination of the methods is also possible.

Cycle life can be improved for sure by determining the particle site distribution after the charging and discharging rather than by determining the particle size distribution before the charging and discharging. The reason can be explained as follows.

Generally speaking, the size of the hydrogen absorbing alloy particles should be uniform in size during the charging and discharging so that electrochemical reaction is not damaged. More specifically, where the particles are uniform in size, i.e., uniform in the surface area, then the same amount of the surface area is activated for each particle. Thus, each particle undergoes the electrochemical reaction in an uniform way.

On the other hand, when the particles are not uniform in size, since large particles are inert they do not contribute to charging and discharging reaction. And as small particles selectively repeat charging and discharging, which makes small particles even smaller, cycle life is shortened due to the fall out of the alloy from the electrode or oxidation/deterioration of the alloy.

Therefore, as the initial particle distribution value, i.e., initial y/x value, is smaller, in other words, as the particle distribution curve is sharper, the cycle characteristics are better.

As the charging and discharging cycle proceeds, the particle size distribution y/x value becomes large, in other words, particle size distribution tend to become broad. However, the particle size rapidly becomes smaller at the initial stage. Especially, during activation, as depth of charge and discharge is deep, the particle size becomes rapidly small. After that, the particles become gradually small. Therefore, it can be assumed that there is a strong correlation between the particle size distribution and the cycle life after the initial charging and discharging compared to the correlation between the initial particle size distribution and the cycle life.

Moreover the inventor has found from experiments that the cycle life significantly improves when the particle size distribution y/x value (x=average particle size, y=standard deviation) after at least one-cycle charging and discharging is below 0.90.

As mentioned above, according to the present invention, by making the particle size distribution y/x value below 0.90 after cycles of charging and discharging under given conditions, a metal hydride storage cell which has excellent cycle life compared to conventional ones can be obtained.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

Embodiment 1

Figure 1:
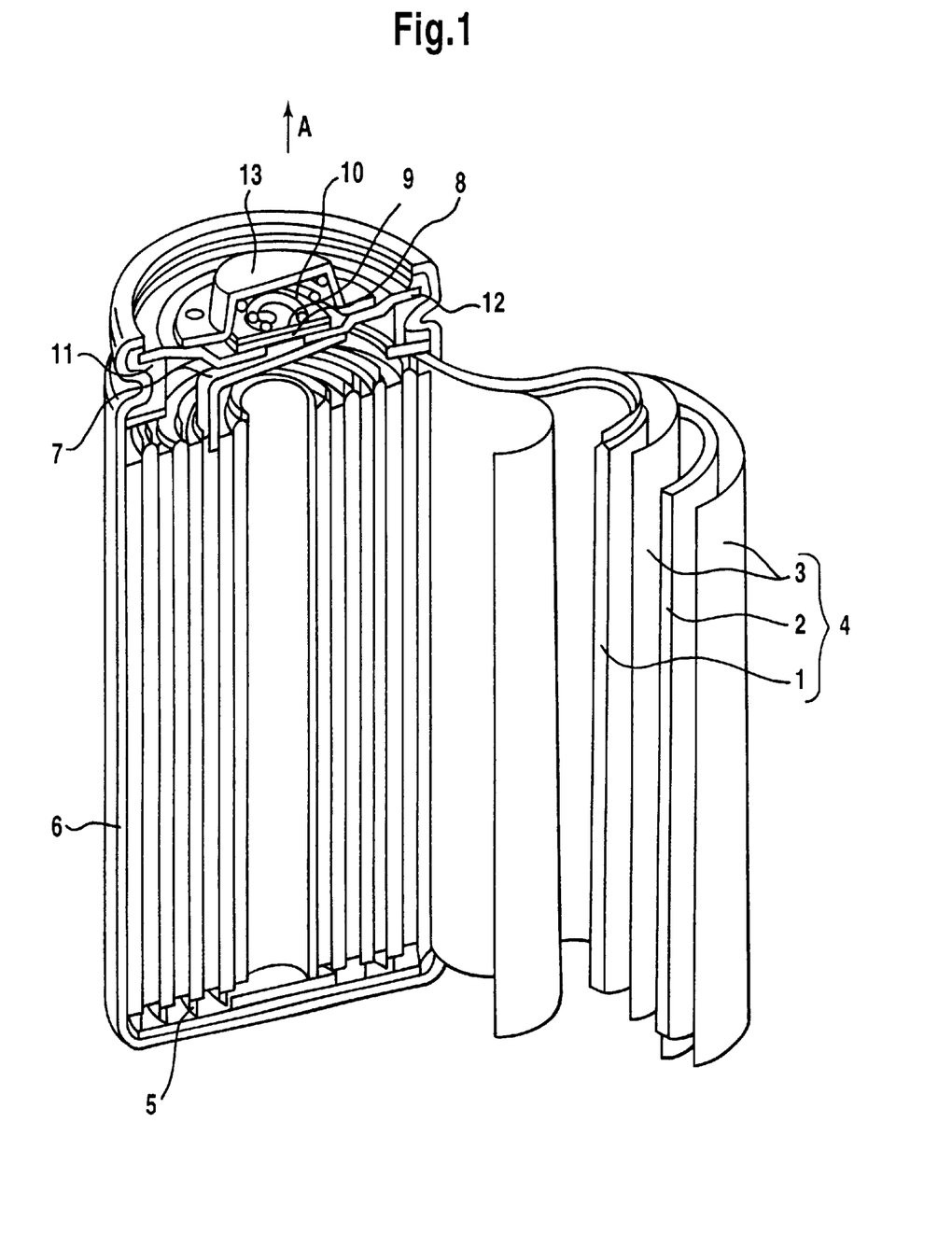
FIG. 1 is a perspective side view of a metal hydride storage cell of the present embodiment.

FIG. 1 is a perspective side view of a cylindrical nickel-hydroxide storage cell, which is an example of a metal hydride storage cell of the present embodiment.

This storage cell comprises positive electrode 1 including nickel active material and hydrogen absorbing alloy electrode 2 (negative electrode 2) compactly wound in a roll and insulated from each other by separator 3 in cylindrical cell casing 6. Alkali electrolyte is impregnated into electrode group 4.

Positive electrode 1 is produced as follows. Active material mainly composed of nickel hydroxide powder is loaded in a nickel solid porous body by using a thickening agent. By pressing and cutting, a positive electrode of a given size can be obtained.

Negative electrode 2 is produced as follows. Hydrogen absorbing alloy is applied on both faces of a punched metal formed in a roll by using a thickening agent. By pressing and cutting, a negative electrode of a given size can be obtained.

At the upper opening of cell casing 6, cover plate 12 having an opening at the center is placed along with gasket 11. Positive electrode 13 is attached to cover plate 12, On cover plate 12, valve 8 and seal plate 9 are attached. Seal plate 9 is pressed by coil spring 10. When the internal gas pressure in the cell increases, valve 8, plate 9, and coil spring 10 are pressed upward (direction of arrow A), with the vent opening and releasing excessive pressure.

Negative electrode 2 is electronically connected to the bottom of cell casing 6 via negative tab 5. Cell casing 6 serves as a negative electrode terminal. Positive electrode terminal 13 is electronically connected to positive electrode 1 via positive tab 7 and cover plate 12.

Method of Producing a Metal Hydride Storage Cell

The metal hydride storage cell mentioned above can be produced according to the following two steps.

The First Step

[Production of Alloy]

Metal elements are measured so as to make a certain ratio g:h:i:j:k (for example, g=1, h=3.4, i=0.8, j=0.2, k=0.6) of Mm(mixture of rare earth element, misch metal):Ni:Co:Al:Mn. The metal elements are melted in a high frequency furnace and injected into a given mold, thereby creating a hydrogen absorbing alloy of compositional formula $Mm_g Ni_h Co_i Al_j Mn_k$.

The hydrogen absorbing alloy is pulverized into a given particle size by a pulverization device like a ball mill in inert gas atmosphere. Then the particles are classified into given meshes. By mixing the particles according to a given ratio, the hydrogen absorbing alloy powder having a desired particle size distribution is obtained. The particle size distribution y/x value tend to be large as the charging and discharging cycle proceeds.

Therefore, it is desirable that the initial particle size distribution y/n value be as small as possible below 0.90.

[Production of Hydrogen Absorbing Alloy Electrode]

As a binding agent, 10 wt % solution of polyethylene oxide is added to the hydrogen absorbing alloy powder in a certain way so that the weight of the solution becomes 1 wt % when calculated in terms of the weight of the active material, thereby creating active material paste. This paste is applied on both faces of a core substance which is made of a punched metal. After pressing, a metal hydroxide alloy electrode can be obtained.

The hydrogen absorbing alloy electrode and the positive electrode are wound compactly in a roll and insulated from each other by a separator in the cell casing, into which electrolyte is poured. In this way, a cell is assembled.

The Second Step

The assembled: cell is activated by charging and discharging under a given condition.

The given conditions are predetermined so as to make the particle size distribution y/x value of the activated hydroxide absorbing alloy below 0.90. The conditions vary, depending on the initial particle size distribution y/x value of the hydrogen absorbing alloy.

The conditions of the activation can vary according to depth of charge, depth of discharge, number of charge-discharge cycles, charge current, discharge current, temperature during activation, recess time after charging and discharging, and temperature after charging and discharging. Practically speaking, however, the conditions can be considered to be determined by depth of charge, depth of discharge, and the number of charge-discharge cycles. Especially, controlling the depth of charge and the depth of discharge is important and it is greatly affected by the particle size distribution y/x value of the activated hydrogen absorbing alloy.

In order to obtain the optimal condition, in other words, in order to minimize the y/x value, the depth of charge and the depth of discharge should not be too deep so long as the activation is possible.

More specifically, the adjustment of depth of charge can be readily implemented by setting the charging time and discharging current. The adjustment of the depth of discharge can be readily implemented by setting the discharge end voltage.

In the case of using the activation conditions determined by adjusting the depth of charge and the depth of discharge, especially, in order to keep the initial particle size distribution y/x value which is below 0.90 but very close to it below 0.90 even after activation, depth of charge and discharge should be as shallow as possible.

Particle Size Distribution of the Hydrogen Absorbing Alloy and Charging and Discharging Cycle Life In the metal hydride storage cell produced in the above mentioned way, the smaller the particle size distribution y/x value of the activated hydrogen absorbing alloy is, the longer the cycle life is.

This can be explained as follows. As the particle size distribution y/x value of the hydrogen absorbing alloy becomes large, the percentage of mixture of large particle diameter and small particle diameter increases. As a result, the small particles are charged and discharge selectively and become even smaller and gets oxidized. The large particles, on the other hand, are not charged and discharged, and they are in an inert state.

The following experiment proves that the cycle life is poor when the activated particle size distribution y/x value is above 0.90 and that the cycle life is excellent when the activated particle size distribution y/x value is below 0.90.

Experiment 1

Experiment 1 is carried out to compare the particle size distribution and charging and discharging cycle life of the activated hydrogen absorbing alloy.

Mm(mixture of rare earth element, misch metal):Ni:Co;Al:Mn are measured so as to make a certain ratio 1.0:3.4:0.8:0.2:0.6, and a hydrogen absorbing alloy ($Mm_{1.0}Ni_{3.4}Co_{0.8}Al_{0.2}Mn_{0.6}$) is created in the foregoing method. This alloy is pulverized into a given particle size and classified into 100#, 200#, 300#, 400#, and 500#. The pulverized particles are mixed according to the ratio shown in Table 1. In this way, hydrogen absorbing alloy powder a, b, and c are produced.

TABLE 1

|   | 100–200# | 200–300# | 300–400# | 400–500# | 500# below | initial y/x |
|---|---|---|---|---|---|---|
| a |  | 30% | 40% | 30% |  | 0.32 |
| b | 25% | 50% | 25% |  |  | 0.32 |
| c | 10% | 25% | 30% | 25% | 10% | 0.66 |

Using the hydrogen absorbing alloy powder a, b, and c, hydrogen absorbing alloy electrodes are produced in the foregoing method. Using the hydrogen absorbing alloy electrodes as negative electrodes along with nickel positive electrodes and 30 wt % of KOH aqueous solution as electrolyte, cylindrical cells of theoretical capacity 1000 mAh are produced. They are activated under the conditions mentioned below (Table 2). In this way, cells A1, A2, B1, B2, C1, C2 and C3 are produced.

Using these cells, charging and discharging cycle experiment is carried out so as to examine the relationship between the activated particle size distribution y/x value and the cycle life of the activated hydrogen absorbing allay.

TABLE 2

| cell | used particle size | activation condition | activated particle size distribution | | | cycle |
|---|---|---|---|---|---|---|
|  |  |  | x ($\mu$m) | y ($\mu$m) | y/x |  |
| A1 | a | 1 | 23 | 20 | 0.87 | 850 |
| A2 | a | 2 | 28 | 20 | 0.71 | 900 |
| B1 | b | 1 | 34 | 32 | 0.94 | 700 |
| B2 | b | 2 | 47 | 32 | 0.68 | 900 |
| C1 | c | 1 | 23 | 24 | 1.04 | 650 |
| C2 | c | 2 | 29 | 27 | 0.93 | 650 |
| C3 | c | 3 | 36 | 25 | 0.69 | 950 |

Conditions for Activation

1. Condition 1

Three-cycle charging and discharging is carried out in a room temperature under the following condition.
    charging: 100 mA*16 hours, recess: one hour
    discharging: 200 mA discharge end-voltage=1.0V recess: one hour 2. Condition 2

Firstly, two-cycle charging and discharging is carried out in a room temperature under the next condition.

| charging | 100 mA*8 hours | recess | one hour |
| discharge | 200 mA | discharge end-voltage = 1.1 V |
| recess | one hour | | |

After that, one-cycle charging and discharging is carried out in a room temperature under the next condition.

| charging | 100 mA*10 hours | recess | one hour |
| discharging | 200 mA | discharge end-voltage = 1.0 V |
| recess | one hour | | |

3. Condition 3

Firstly, two-cycle charging and discharging is carried out in a room temperature under the next conditions.

| charging | 100 mA*5 hours | recess | one hour |
| discharging | 200 mA | discharge end-voltage = 1.1 V |
| recess | one hour | | |

After that, one-cycle charging and discharging is carried out in a room temperature under the next condition.

| charging | 100 mA*10 hours | recess | one hour |
| discharging | 200 mA | discharge end-voltage = 1.0 V |
| recess | one hour | | |

Method of Charging and Discharging Cycle Experiment

Charging and discharging are repeated under the following mentioned conditions, and cycle numbers are evaluated as cell life until the cell capacity reaches 500 mA.

| charging | 1500 mA*48 minutes | recess | one hour |
| discharging | 1500 mA | discharge end-voltage = 1.0 V |
| recess | one hour | | |

Method of Measuring the Particle Size Distribution of the Hydrogen absorbing alloy The particle size distribution of the hydrogen absorbing alloy is measured by MICROTRAC mkII (produced by LEEES & NORTHRUP) which uses the laser diffraction method. In order to measure the activated particle size distribution, the negative electrode is washed by pure water and dried, and only alloys are collected and measured. In Stead of the laser diffraction method, sedimentation method can be used, and the same value can be obtained.

First, volume particle size frequency f of the particles that fall in the following ranges expressed by z are measured.

| | | | |
|---|---|---|---|
| 0.9 ≤ z < 1.4 | 1.4 ≤ z < 2.8 | 2.8 ≤ z < 3.9 | 3.9 ≤ z < 5.5 |
| 5.5 ≤ z < 7.8 | 7.8 ≤ z < 11 | 11 ≤ z < 16 | 16 ≤ z < 22 |
| 22 ≤ z < 31 | 31 ≤ z < 44 | 44 ≤ z < 62 | 62 ≤ z < 88 |
| 88 ≤ z < 125 | 125 ≤ z < 176 | 17 ≤ z < 250 | 250 ≤ z < 350 |
| 350 ≤ z < 500 | 500 ≤ z < 700 | | |

(unit: $\mu$m, z: paricle diameter)

From the maximum value and the minimum value of the particle diameter of each range, representative value d($\mu$m) is calculated as follows.

$$d=\{(\text{maximum value})*(\text{minimum value})\}^{1/2}$$

Next, average particle diameter x($\mu$m), standard deviation y ($\mu$m) are obtained from the following formula, and particle size distribution y/x value are calculated $$x=\exp[\Sigma(\log_e d * f)], \ y=[\Sigma\{(d-x)^2 * f\}]^{1/2}$$

Table 2 shows that in the case of cells A1, A2, B2, and C3 having activated particle size distribution y/x value below 0.90, the cycle life is excellent, which is equal to or above 850; whereas in the case of other cells having the activated particle sized distribution y/x value above 0.90, the cycle life is poor, which is equal to or below 700. Therefore, it can be concluded that by keeping the particle size distribution y/x value below 0.90 even after the activation, cycle life can be improved.

Table 2 also shows that the activated particle size distribution y/x value under condition 2 is smaller than the one under condition 1, and the activated particle size distribution y/x value under condition 3 is even smaller than the one under condition 2. Therefore, it can be concluded that in order to keep the activated particle size distribution y/x value below 0.90, activation should be carried out under the condition in which the depth of charge is shallow as much as possible.

For each cell, the initial particle size distribution y/x value, which is before activation, is set as follows: 0.32 for cells A1, A2, B1, B2, and B3; and 0.66 for cells C1, C2, and C3. In other words, all cells have the initial particle size distribution y/x value of the hydrogen absorbing allot below 0.90. If, however, the particle size distribution y/x exceeds 0.90, the cycle life cannot be improved.

More specifically, in the case of powder a and b that have the small initial particle size distribution y/x value, even if the deep depth of charging is used as activation condition, the activated particle size distribution y/x value is below 0.90, and the cycle life can be improved.

On the other hand, in the case of powder c which has the initial particle size distribution y/x value which is rather close to 0.90, under activation conditions 1 and 2 of deep depth of charging, the activated particle size distribution y/x value exceeds 0.90, and cycle life cannot be improved. However, if it is activated under condition 3 (shallow depth of charge), the activated particle size distribution y/x value becomes 0.69, and the cycle life is excellent, which is 950.

Embodiment 2

The metal hydride storage cell of the present embodiment is almost the same as that of the first embodiment except that it differs in the method of producing hydrogen absorbing alloy used for the electrode.

The hydrogen absorbing alloy is created by casting. To this point, the same procedure as the first embodiment has been carried out. What should be noted here In the present embodiment is that the alloy ingot is heated at above 800° C. in an Inert gas atmosphere for a given time. The heated alloy i: pulverized, classified into given meshes, and mixed so as to make the particle size distribution y/x value below 0.90. Using the heat treated hydrogen absorbing alloy powder, a metal hydride storage cell is produced in the same way as the first embodiment.

According to the present embodiment, due to the heat treatment at above 800° C., the hydrogen absorbing alloy powder do not readily become more fine during charging/discharging. Therefore, compared to the cell of the first embodiment, even if activated under the conditions of deeper depth of charge/discharge, a cell whose particle size distribution y/x value is below 0.90 can be produced, thus realizing an excellent cycle life.

If the heat treatment temperature exceeds 1200° C., the hydrogen absorbing alloy itself dissolves, with its structure being destroyed Therefore, it is desirable to heat treat below 1200° C.

Experiment 2

Cells E1, F1, and G1 are produced in the following way.

Powder a of the first experiment is heat treated, before pulverizing, in an inert gas atmosphere at 600° C., 800° C., and 1000° C. respectively, for ten hours. Using the heat treated powder under activation condition 1, cells E1, F1, and G1 are produced in the same way as Experiment 1. The particle size distribution after the activation of the hydrogen absorbing alloy is measured in the same method used in the first experiment. The method is also used in the third experiment.

Using cells E1, F1, G1, and C1, charging and discharging cycle experiment is carried out to examine the effect of heat treating the hydrogen absorbing alloy. The result is shown in Table 3.

TABLE 3

| cell | heat treatment temperature | activated particle size distribution | | | |
|---|---|---|---|---|---|
| | | x ($\mu$m) | y ($\mu$m) | y/x | cycle |
| C1 | — | 23 | 24 | 1.04 | 650 |
| E1 | 600 | 23 | 22 | 0.95 | 600 |
| F1 | 800 | 23 | 20 | 0.87 | 830 |
| G1 | 1000 | 23 | 18 | 0.78 | 910 |

Table 3 shows that even though all cells have hydrogen absorbing alloy powder c and are activated under condition 1, due to the heat treatment above 800° C., the particle size distribution y/x value after activation becomes small, and cycle life greatly improves as can be recognized by 650 of cell C1, 830 of cell F1, 910 of call G1.

Embodiment 3

The metal hydride storage cell of the present embodiment has the same composition as the cell of the first embodiment, except that the hydrogen absorbing alloy used in the electrode is created by a well known rapid quenching method, such as single roll method, twin roll method, Gas Atomization, and rotary disk method.

Compared to the hydrogen Absorbing alloy produced by the casting, the hydrogen absorbing alloy created by the rapid quenching method has the different structure between quenching part and the other part because the cooling solidification speed in the production process is fast, and the particle size distribution y/x value tend to be large as the charging and discharging cycle proceeds.

Therefore, in the case of producing a cell using the hydrogen absorbing alloy created by the rapid quenching method, there is a greater significance in making the activated particle size distribution y/x value below 0.90 for producing a cell having the hydrogen absorbing alloy created by the rapid quenching method than for producing a cell having the hydrogen absorbing alloy created by the casting.

Especially, in the case of the hydrogen absorbing alloy created by roll method, the cooling speed on the roll side and the cooling speed on the liberated side are different. Therefore, compared to the alloy, on the roll side, the alloy on the liberated side has a tendency to become more fine. The particle size distribution y/x value tend to be large by, among other methods, roll method, Therefore, significance of making the activated particle size distribution y/x value below 0.90 is especially great.

Experiment 3

Hydrogen absorbing alloy powder d, e, f having the same composition and particle size distribution as powder a, b, c of the first experiment are produced by single roll method. Using powder d, e, f, metal hydride storage cells of α1, α2, α3 are produced under the activation condition (Table 4). Also, hydrogen absorbing alloy of powder d is heat treated in the same way as Experiment 2 at 600° C., 800° C., and 1000° C. Powder e and f are heat treated in the same way as the second experiment et 800° C. Using such powders, cells α4, α5, α6, α7, β1 and γ1 are produced under given conditions.

Using the cells thus produced, charging/discharging cycle experiment is carried out so as to examine the relationship between the particle size distribution of the activated hydrogen absorbing alloy and the cycle life. Table 4 shows the result.

TABLE 4

| cell | used particle size | activation condition | heat treatment temperature | activated particle size distribution | | | |
|------|-------------------|---------------------|---------------------------|---|---|---|---|
| | | | | x(μm) | y(μm) | y/x | cycle |
| 1 | d | 1 | — | 28 | 34 | 1.07 | 600 |
| 1 | d | 2 | — | 34 | 41 | 0.91 | 620 |
| 1 | d | 3 | — | 37 | 30 | 0.81 | 870 |
| 1 | d | 2 | 600 | 34 | 32 | 0.94 | 700 |
| 1 | d | 3 | 600 | 37 | 32 | 0.86 | 850 |
| 1 | d | 2 | 800 | 26 | 18 | 0.69 | 1000 |
| 1 | d | 2 | 1000 | 25 | 17 | 0.67 | 1000 |
| 1 | e | 2 | 800 | 30 | 30 | 1.00 | 670 |
| 1 | f | 2 | 800 | 26 | 22 | 0.85 | 850 |

Table 4 shows that cells α3, α5, α6, α7, and γ1 that have activated particle size distribution y/x value which is below 0.90 have cycle life which is equal to or above 850; whereas α1, α2, α4, and β1 have cycle life which is equal to or below 700. It can be assumed that the reason is the same as that of Experiment 1.

Figure 4:
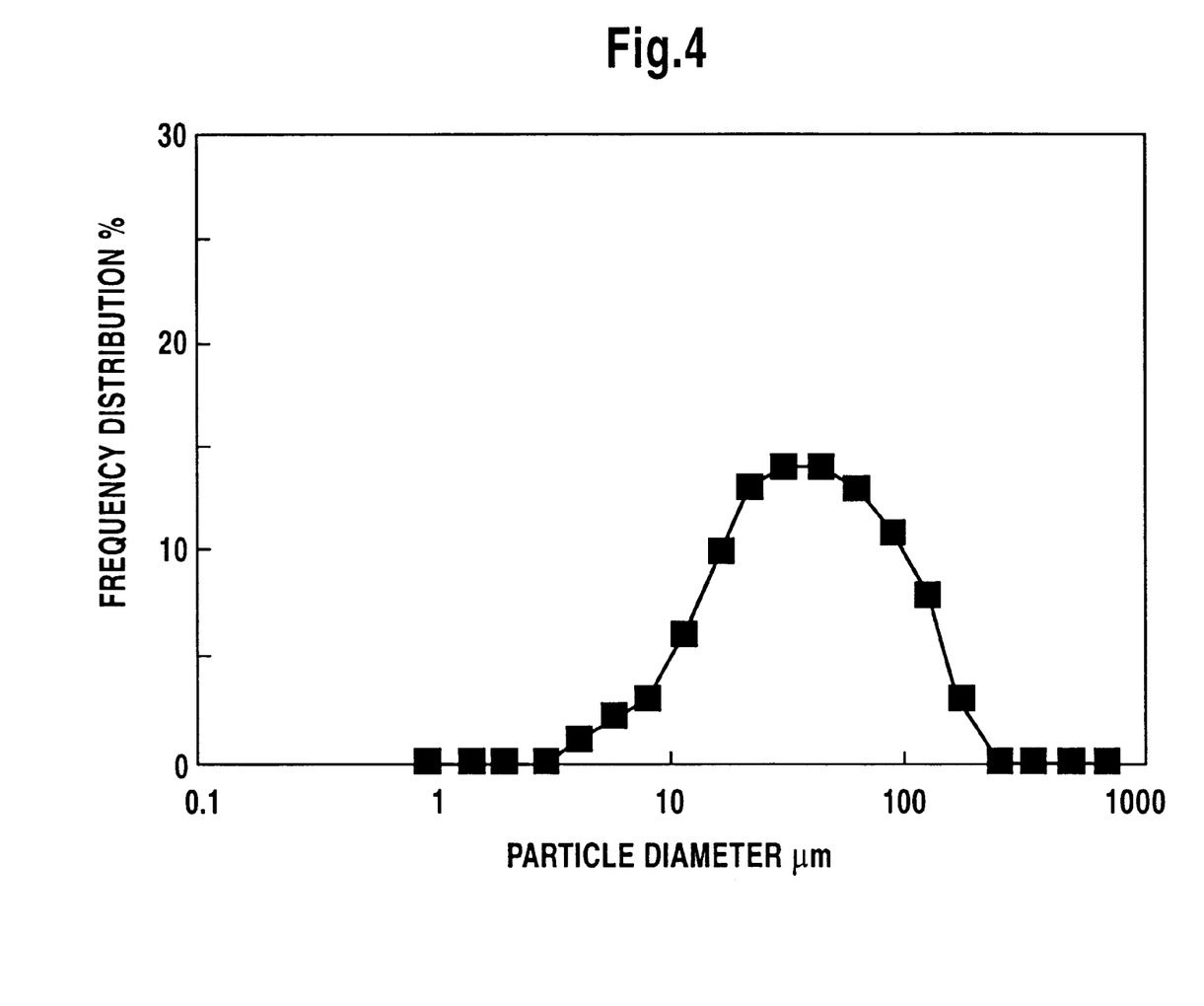
FIG. 4 shows the particle size distribution after cell α1 is activated.
Figure 5:
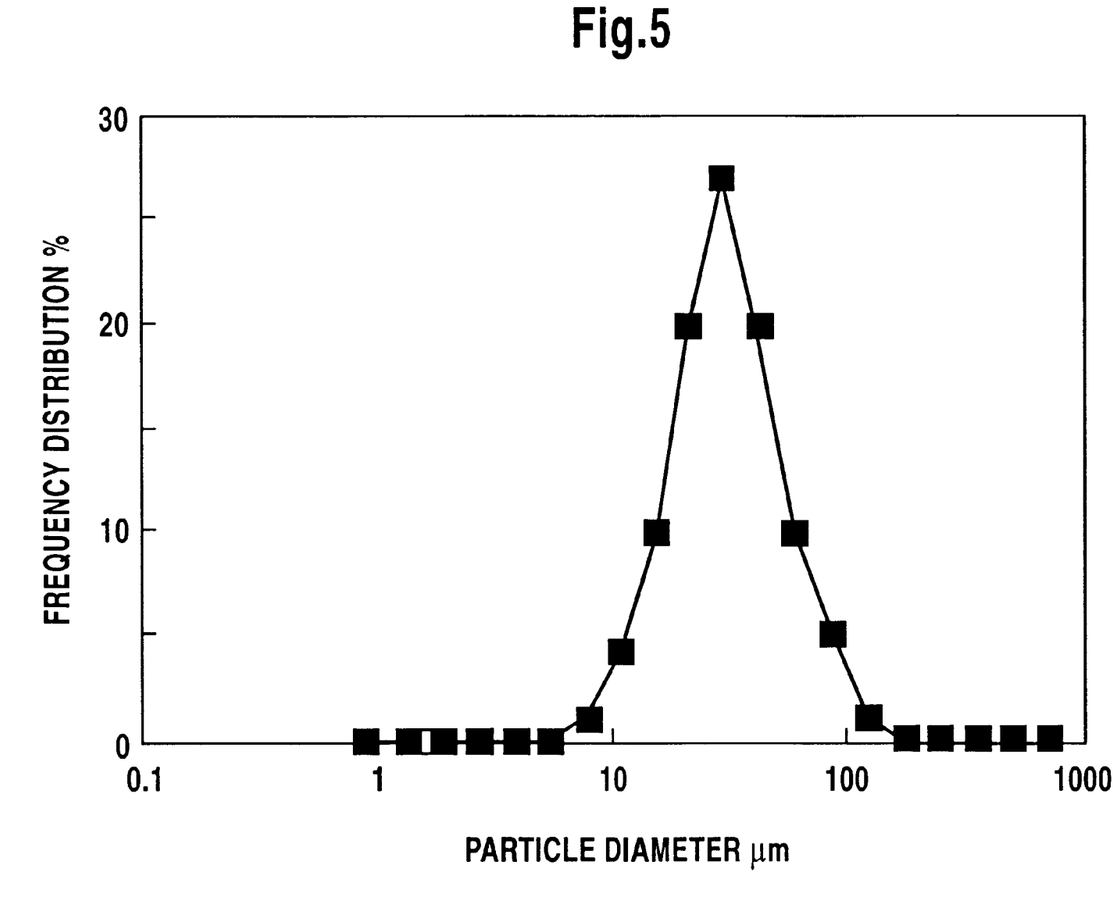
FIG. 5 shows the particle size distribution after cell α1 is activated.

FIG. 4 shows particle size distribution of hydrogen absorbing alloy of activated cell α1. FIG. 5 shows particle size distribution of hydrogen absorbing alloy of activated call α7. In FIGS. 4 and 5, x-axis shows particle size, and y-axis shows volume particle size frequency f.

As is apparent from FIGS. 4 and 5, the particle size distribution of the hydrogen absorbing alloy of the activated cell α7 is sharper than that of cell α1.

Reflections on Experiments 1–3

Figure 2:
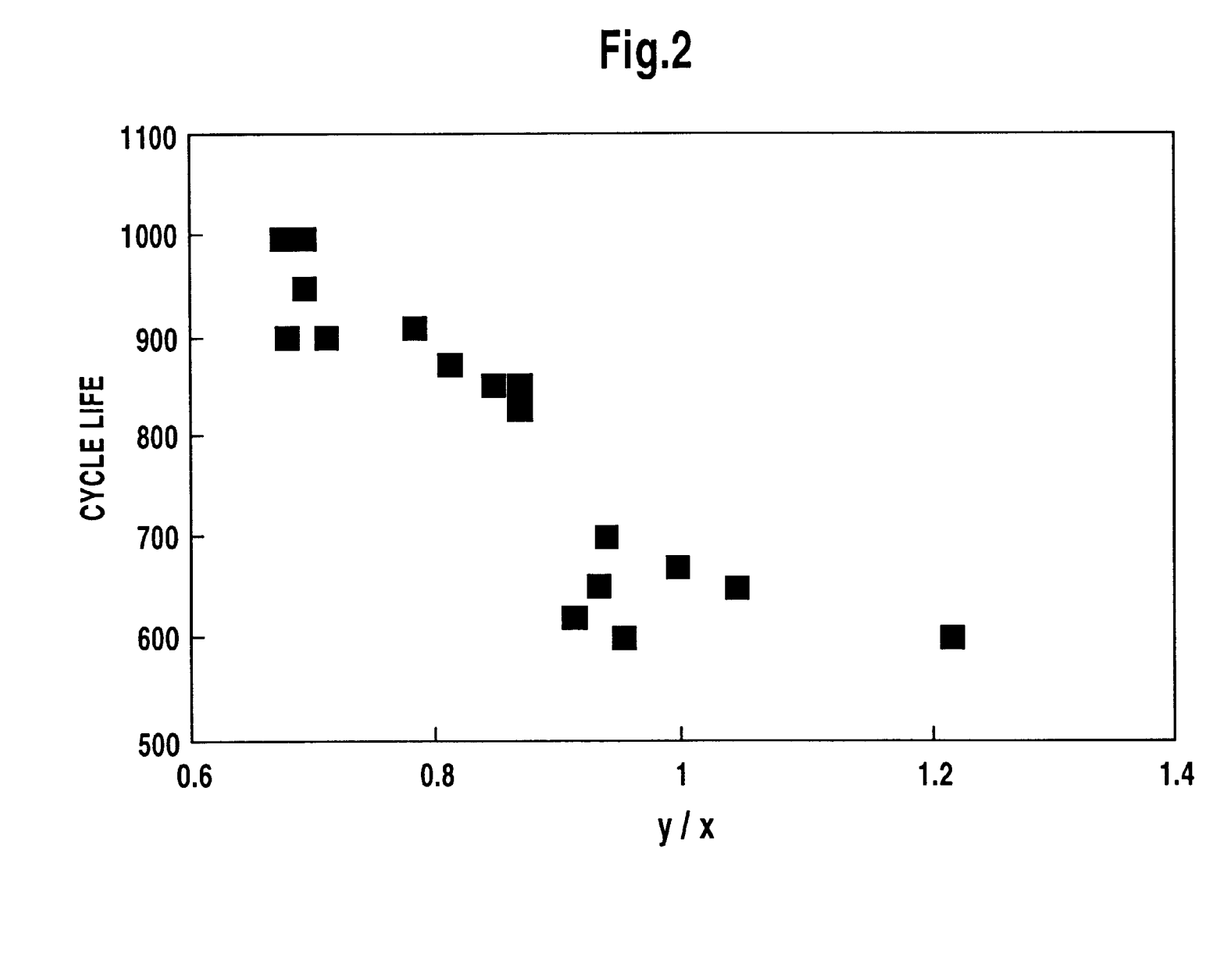
FIG. 2 is a plot showing relationship between the particle size distribution and the cycle life of the activated hydrogen absorbing alloy.
Figure 3:
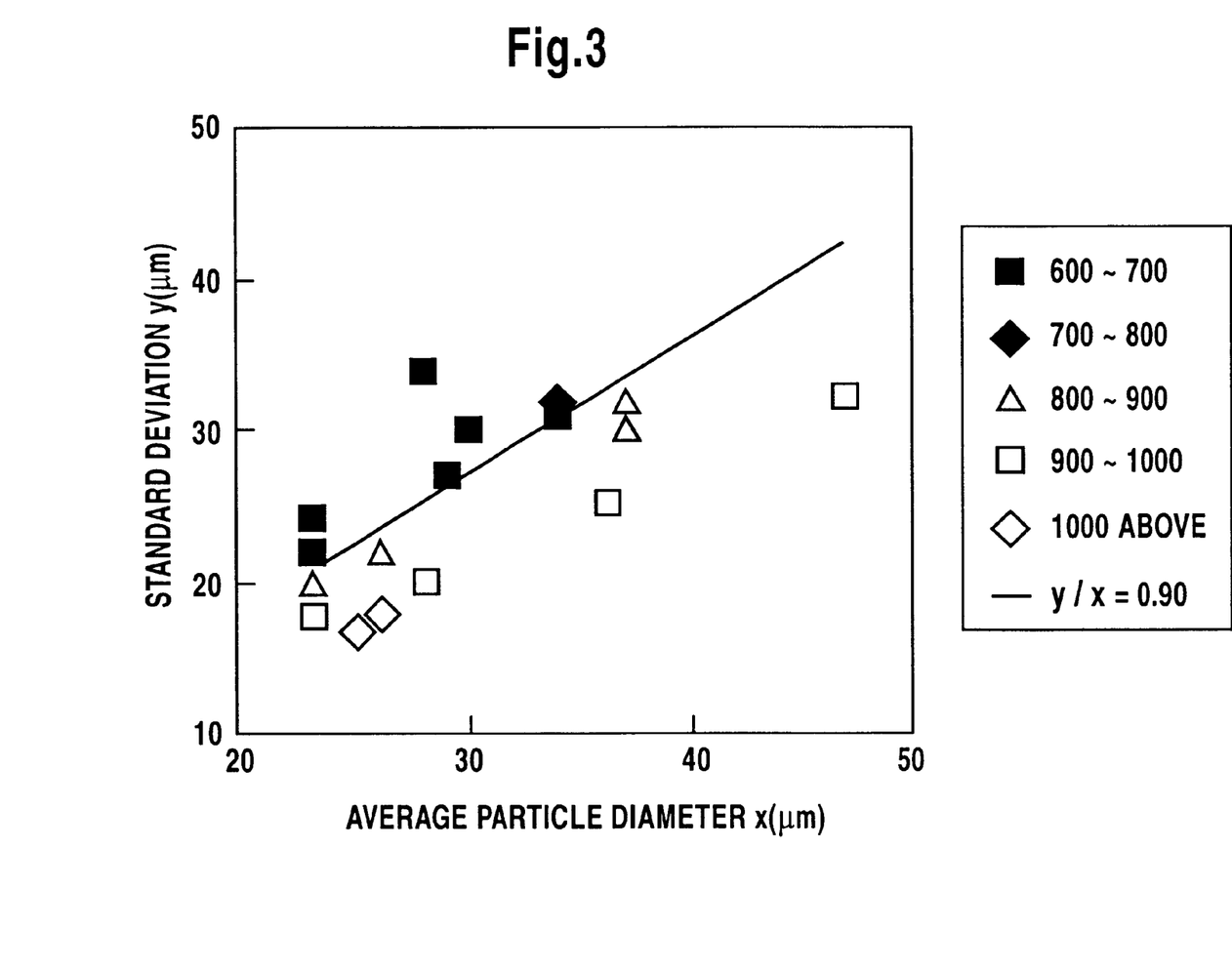
FIG. 3 is another plot showing relationship between the particle size distribution and the cycle life of the activated hydrogen absorbing alloy.

FIGS. 2 and 3 are based on the results of Experiments 1–3.

In FIG. 2, x-axis shows particle size distribution y/x value and y-axis shows cycle life (cycle number). In FIG. 3, x-axis shows average particle diameter x(μm) and y-axis, shows standard deviation y(μm). In FIG. 3, hollow marks show cycle life above 800 and the black marks show cycle life below 800.

FIG. 2 shows that cycle life differs significantly, with the particle size distribution y/x value of 0.90 being a critical value. FIG. 3 shows that cycle life does not exceed 800 when the particle size distribution y/x value is above 0.90, and that the cycle life exceeds 800 when the particle size distribution y/x value is below 0.90.

In the present embodiment, as a hydrogen absorbing alloy, rare earth type alloy is used. However, the sane effect can be obtained by Titanium-based, Zirconium-based, and Magnesium-based hydrogen absorbing alloys.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A metal hydride storage cell, comprising an electrode of hydrogen absorbing alloy particles, said hydrogen absorbing alloy particles having a particle size distribution of y/x<0.90 after an initial charging and discharging of said metal hydride storage cell, with x being an average particle diameter and y being a standard deviation of particle diameters.

* * * * *